UNITED STATES PATENT OFFICE.

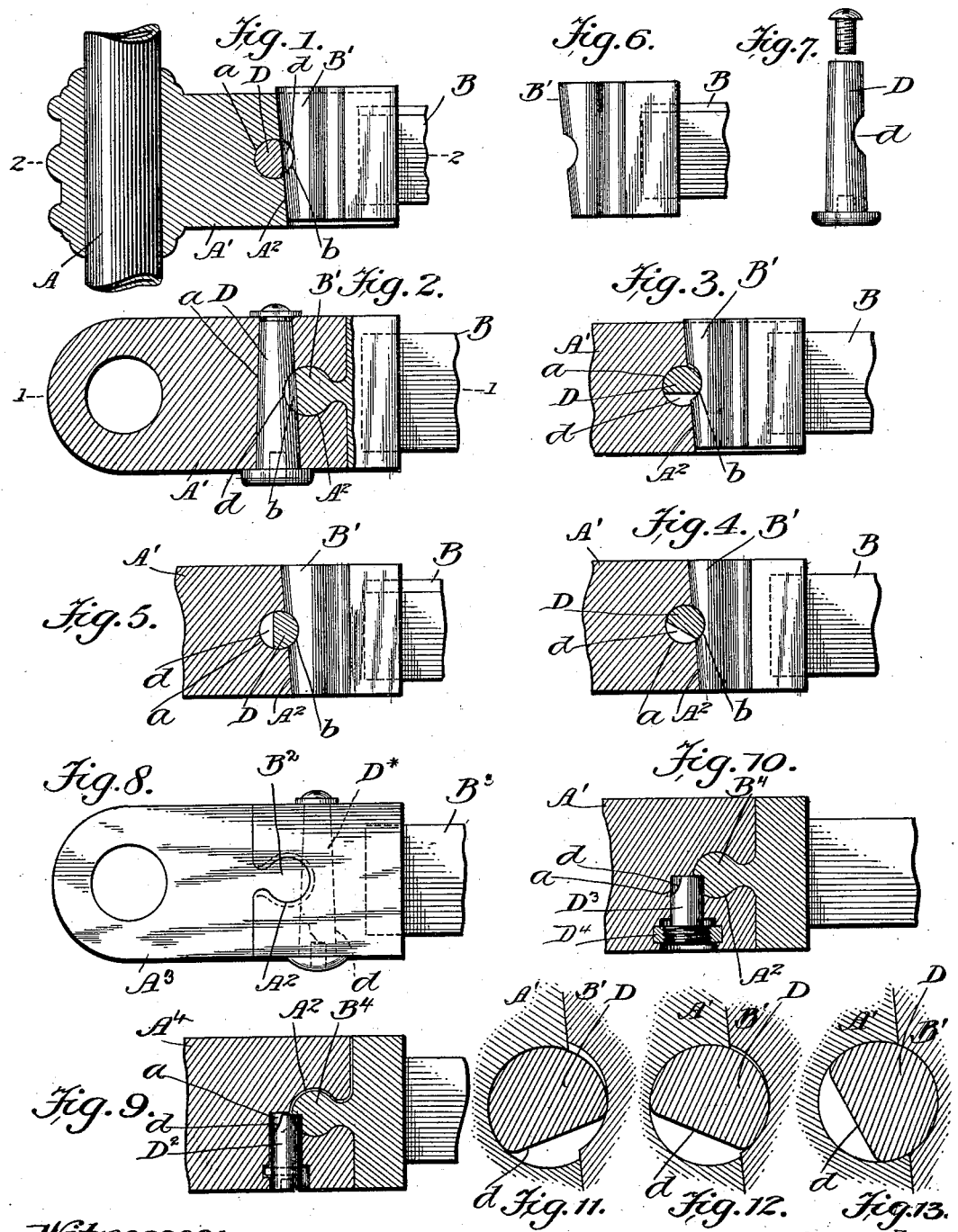

HERMANN REINHOLD, OF BERLIN, GERMANY.

LOCKING APPLIANCE FOR METALLIC BEDSTEADS.

SPECIFICATION forming part of Letters Patent No. 673,568, dated May 7, 1901.

Application filed February 17, 1900. Serial No. 5,603. (No model.)

*To all whom it may concern:*

Be it known that I, HERMANN REINHOLD, a subject of the King of Prussia, German Emperor, residing at Berlin, in the Kingdom of Prussia, German Empire, have invented a certain new and useful Improvement in Bedstead-Fastenings, of which the following is a specification.

This invention relates to the joints between the horizontal bearers of metallic bedsteads and the posts or pillars thereof which comprise vertically-tapering dovetail tongues on the one part which fit into correspondingly-tapered dovetail grooves on the other part. Such construction as heretofore carried out does not afford a sufficiently firm fastening, and bedsteads so constructed are liable to rock to and fro, and there is always the risk that one of the parts may rise out of its engagement, causing the bedstead to collapse.

The present invention has for its object to obviate these disadvantages; and it consists in combining with each such tapering dovetail joint a horizontal rotatable locking pin or bolt which is consequently at right angles to the dovetail joint and which is hollowed or notched at one point and so arranged that it engages with a recess or notch in the tapering dovetail tongue and by being partially rotated locks the dovetail tongue into the dovetail groove. Taking care to make the parts rightly proportioned and turning the pin with force it also presses the parts so firmly together as to make the joint perfectly rigid, practically constituting one piece. The junction of the several horizontal rails or bearers with the several posts being all alike, a description of one will suffice for all. The entire bedstead is rendered a completely rigid structure. A reversing of the movement allows the parts to be separated.

The following is a description of what I consider the best means of carrying out the invention, reference being made to the accompanying drawings, forming part of this specification.

Figure 1 is a vertical longitudinal section on the line 1 1 in Fig. 2. Fig. 2 is a horizontal section on the line 2 2 in Fig. 1. In these views the parts are not locked. Figs. 3 and 4 are sections corresponding to Fig. 1, the pin being partially rotated. Fig. 5 is a section showing the pin turned completely and holding the parts strongly compressed together. Fig. 6 is a side view of the right-hand part of Fig. 1 detached. Fig. 7 is a plan view of the pin in Fig. 1 detached. Fig. 8 is a plan of a slightly-modified form of construction. Fig. 9 is a horizontal section through the adjacent coupling parts of another modification; and Fig. 10 is a view similar to Fig. 9, showing still another form of construction. Figs. 11, 12, and 13 are diagrams, on a larger scale, showing three stages in the act of turning the pin or bolt. All are central vertical sections.

Similar letters of reference indicate corresponding parts in all the figures where they appear.

Referring to Figs. 1 to 7, inclusive, the grooved joint-piece A', fixed to the bed-post A in the usual manner, is provided with a dovetail groove $A^2$, tapering downward, into which engages the correspondingly-tapered dovetail tongue B' of the casting, fixed to the rail or bearer B of the bedstead. With this previously-known construction is combined my locking device consisting of the conical bolt D, fitted through a correspondingly-coned hole $a$ in the piece A' and also engaging with a corresponding hollow or notch $b$, formed in the dovetail tongue B'. The bolt D is loosely secured in position by a screw E and washer E' on its small end and has a transverse groove or notch $d$ formed on one side, as shown in Figs. 5 and 7, which when in the position shown in Fig. 1 allows the dovetail tongue B' to be inserted into or raised out of the groove $A^2$. The tongue B' having been lowered into the groove while the parts are in this position, but by reason of its size being arrested a little short of its desired position, the bolt or pin D is next turned half around, whereby the full part of the bolt is made to enter and fill the notch $b$, as shown in Fig. 5. For effecting such rotation of D its head is provided with suitable means, such as an angular recess in the large end, into which is inserted a key (not shown) for turning it. It will now be understood that when the bolt D is in the receiving and releasing position first described the dovetail tongue B' is lowered and pressed down with gentle force into the dovetail groove $A^2$ until the notch $b$ nearly coincides with the hole $a$, but slightly higher, because the part B B', so large as to be arrested by friction, is not yet tightened down into its groove A². Such drawing down and tightening is afterward effected by the partial rotation of the bolt D. When this has been turned into the position shown in Fig. 3, the full part thereof will bear in a downward direction against the lower part of the notch b, so that on the further rotation of D it will force B' downward and tighten it in its groove until the notch b has been brought down sufficiently to coincide in position with the hole a, as shown in Fig. 4. The locking is thus completed. The bolt D may preferably be turned slightly farther until it assumes the position shown in Fig. 5—that is to say, it has been turned half around. The bearer B and the bed-post A are thus rigidly secured together. This operation having been repeated at all four posts of the bed, the desired perfectly-rigid structure will be obtained. In order to unlock the joint, the pin or bolt D is turned in the opposite direction, so that its notch d again faces the tongue B'. Then the latter can be raised again out of the groove A².

Modifications may be made without departing from the principle or sacrificing the advantages of the invention. The dovetail joint may be the reverse of that shown—that is to say, the tongue B² can be formed on the casting A³ of the bed-post and the corresponding dovetail groove can be in the bearer B³, the parts being inverted. This is shown in Fig. 8, the bolt D* being fitted through a corresponding hole in the casting carried on the end of the bearer. The action corresponds to that above described, the dovetail groove being in this case similarly drawn down and tightened by the partial rotation of the bolt. Instead of arranging the bolt to pass entirely through the one or other part of the joint it may extend only about half through the same, as shown at D² in sectional plan in Figs. 9 and 10. In both these figures the short bolt has a recess at its inner end corresponding to the notch in the longer form and correspondingly engages with a notch of the tongue B⁴. In Fig. 9 it is secured in the part A⁴ by means of a kind of bayonet-joint. Fig. 10 shows a similar construction of bolt D³, but with a different arrangement for securing it. The bolt is here provided with a screw-head working in a screw-threaded ring or nut D⁴. The bolt is formed with a notch or recess, as in Fig. 9. In all the cases the part of the bolt engaging with the hollow or notch of the dovetail tongue operates in the same manner as described with reference to Figs. 1 to 7, the rotation of the bolt being made to effect both the locking and the drawing inward of the tongue into the dovetail groove to the rigidly-locked position.

The diagrams, Figs. 11 to 13, apply to all the forms. Fig. 11 shows the pin slightly turned. Fig. 12 shows it further turned and commencing to depress the bearer, and Fig. 13 shows it near its final position of rest with the bearer not only locked, but also forcibly drawn down, so that the junction is rigid.

I claim as my invention—

1. The combination in a bedstead-fastening, of a bed-post and bearer having a tapering dovetail tongue and groove, respectively adapted to hold and release the post at will, the grooved part having a transverse hole or support and the tongue, having a nearly coinciding notch with a pin mounted in such hole or support for engaging the tongue, substantially as herein specified.

2. In a bedstead-fastening a tapering dovetail on one part having a notch therein and a groove in the other part corresponding to the dovetail and a tapering pin or key inserted in a transverse aperture in the grooved part arranged to engage in the said notch in the dovetail and means for reliably holding the key against displacement all arranged for joint operation substantially as herein specified.

3. The combination in a bedstead-fastening of a bed-post and bearer having a tapering dovetail tongue and groove respectively, adapted for engagement, one of said parts having a hole or support transverse to such tongue, a rotatable pin mounted in such hole or support and arranged to engage with it, the tongue having a transverse notch and the pin having also a transverse notch, all substantially as herein specified.

4. The combination in a bedstead-fastening of a bed-post and bearer having a tapering dovetail tongue and groove respectively adapted for engagement the grooved part having a hole transverse to such tongue and the tongue having a nearly corresponding transverse notch, a rotatable pin mounted in such hole or support and arranged to engage with it, and having a notch, all proportioned as described, so that in applying the parts together the tongue is arrested at first by friction a little short of its fully-engaging position and a further revolution of the pin will not only lock the parts but will also draw them more forcibly together, all adapted to serve substantially as herein specified.

In witness whereof I have hereunto set my hand in presence of two witnesses.

HERMANN REINHOLD.

Witnesses:
WOLDEMAR HAUPT,
HENRY HASPER.